United States Patent
Yoo et al.

(10) Patent No.: US 6,930,462 B2
(45) Date of Patent: Aug. 16, 2005

(54) APPARATUS AND METHOD FOR CONTROLLING OPERATION OF COMPRESSOR

(75) Inventors: Jae Yoo Yoo, Gyeonggi-Do (KR); Chel Woong Lee, Seoul (KR); Ji Won Sung, Seoul (KR); Hyuk Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 258 days.

(21) Appl. No.: 10/385,475

(22) Filed: Mar. 12, 2003

(65) Prior Publication Data

US 2004/0067140 A1 Apr. 8, 2004

(30) Foreign Application Priority Data

Oct. 4, 2002 (KR) .................. 10-2002-0060730

(51) Int. Cl.[7] .................. G05D 23/275; H02P 1/00; F04B 49/06
(52) U.S. Cl. .................. 318/632; 318/556; 417/44.1; 417/45; 417/44.11; 417/53; 62/6; 62/228.1; 62/156
(58) Field of Search .................. 318/630–632, 318/556, 135; 417/44.1, 53, 44.11

(56) References Cited

U.S. PATENT DOCUMENTS

| | | | | |
|---|---|---|---|---|
| 5,342,176 A | * | 8/1994 | Redlich | 417/212 |
| 5,658,132 A | * | 8/1997 | Akazawa et al. | 417/45 |
| 6,028,406 A | * | 2/2000 | Birk | 318/254 |
| 6,176,683 B1 | * | 1/2001 | Yang | 417/44.1 |
| 6,289,680 B1 | * | 9/2001 | Oh et al. | 62/6 |
| 6,520,746 B2 | * | 2/2003 | Yoo et al. | 417/44.11 |
| 6,524,075 B2 | * | 2/2003 | Hwang et al. | 417/44.11 |
| 6,537,034 B2 | * | 3/2003 | Park et al. | 417/44.1 |
| 6,541,953 B2 | * | 4/2003 | Yoo et al. | 324/76.52 |
| 6,554,577 B2 | * | 4/2003 | Park et al. | 417/44.1 |
| 6,616,414 B2 | * | 9/2003 | Yoo et al. | 417/44.1 |
| 6,623,246 B2 | * | 9/2003 | Hwang et al. | 417/44.1 |
| 6,682,310 B2 | * | 1/2004 | Yoo et al. | 417/42 |
| 2002/0051710 A1 | * | 5/2002 | Yoo et al. | 417/44.11 |
| 2002/0090304 A1 | * | 7/2002 | Yoo et al. | 417/44.1 |
| 2002/0093327 A1 | * | 7/2002 | Yoo et al. | 324/76.52 |
| 2002/0113565 A1 | * | 8/2002 | Kim et al. | 318/556 |
| 2002/0150477 A1 | * | 10/2002 | Hwang et al. | 417/44.1 |
| 2003/0026702 A1 | * | 2/2003 | Yoo et al. | 417/44.11 |
| 2003/0180151 A1 | * | 9/2003 | Jeun | 417/44.11 |
| 2004/0066163 A1 | * | 4/2004 | Yoo et al. | 318/632 |
| 2004/0071556 A1 | * | 4/2004 | Sung et al. | 417/44.1 |

* cited by examiner

Primary Examiner—Paul Ip
(74) Attorney, Agent, or Firm—Greenblum & Bernstein, P.L.C.

(57) ABSTRACT

In an apparatus and a method for controlling operation of a compressor, by removing deviation generated by resistance and inductance and removing an error in a stroke estimation value of a compressor, operation of the compressor can be accurately controlled. The apparatus includes a counter electromotive force detector for detecting a counter electromotive force generated at a motor of a compressor. A stroke calculator calculates a stroke estimation value of the compressor on the basis of the counter electromotive force, and a stroke controller controls a stroke of the compressor by varying a voltage applied to the motor on the basis of the calculated stroke estimation value and a stroke reference value.

3 Claims, 4 Drawing Sheets

APPARATUS AND METHOD FOR CONTROLLING OPERATION OF COMPRESSOR

BACKGROUND OF THE INVENTION

1. Field of the Invention

The present invention relates to a compressor, and in particular to an apparatus and a method for controlling operation of a reciprocating compressor by estimating a stroke of the reciprocating compressor.

2. Description of the Prior Art

FIG. 1 is a block diagram illustrating a construction of an operation control apparatus of a reciprocating compressor in accordance with the conventional art.

As depicted in FIG. 1, the operation control apparatus of the reciprocating compressor includes a current detector 4 for detecting current applied to a motor (not shown) of a reciprocating compressor 6, a voltage detector 3 for detecting a voltage applied to the motor, a stroke calculator 5 for calculating a stroke estimation value of the compressor 6 on the basis of the detected current, voltage and parameters of the motor, a comparator 1 for comparing the calculated stroke estimation value with a preset stroke reference value and outputting a difference value according to the comparison result, and a stroke controller 2 for controlling a stroke of the compressor 6 by varying a voltage applied to the motor according to the difference value. Hereinafter, the operation of the operation control apparatus of the reciprocating compressor will be described.

First, the current detector 4 detects current applied to the motor of the compressor 6 and outputs the detected current to the stroke calculator 5. Herein, the voltage detector 3 detects a voltage applied to the motor and outputs the detected voltage value to the stroke calculator 5.

The stroke calculator 5 calculates a stroke estimation value of the compressor with Equation 1 by substituting the detected current value, the detected voltage value and the parameters of the motor and applies the calculated stroke estimation value to the comparator 1.

$$X = \frac{1}{\alpha} \int (V_M - Ri - L\bar{i}) dt \qquad \text{Equation 1}$$

Herein, R is resistance, L is inductance, $\alpha$ is a motor constant, $V_M$ is a voltage applied to the motor, i is current applied to the motor, and $\bar{i}$ is a time variation rate of current applied to the motor. In more detail, $\bar{i}$ is a differential value (di/dt) of i.

Afterward, the comparator 1 compares the stroke estimation value with the stroke reference value and applies a difference between the stroke estimation value and the stroke reference value according to the result of the comparison to the stroke controller 2.

The stroke controller 2 controls a stroke by varying the voltage applied to the motor of the compressor 6 on the basis of the above difference. It will be described in detail with reference to accompanying FIG. 2.

FIG. 2 is a flow chart illustrating an operation control method of the reciprocating compressor in accordance with the conventional art.

First, when a stroke estimation value is applied from the stroke calculator 5 to the comparator 1 as shown at step SP1, the comparator 1 compares the stroke estimation value with a stroke reference value and outputs the difference between the stroke estimation value and the stroke reference value according to the result of the comparison result to the stroke controller 2 as shown at step SP2.

When the stroke estimation value is less than the stroke reference value, the stroke controller 2 increases a voltage applied to the motor in order to control a stroke of the compressor 6 as shown at step SP3, and when the stroke estimation value is greater than the stroke reference value, the stroke controller 2 decreases a voltage applied to the motor as shown at step SP4.

As described above, in the apparatus and the method for controlling operation of the reciprocating compressor in accordance with the conventional art, a stroke estimation value is calculated by using parameters (motor constant, resistance, inductance) of the motor, and a stroke of the compressor is controlled on the basis of the calculated stroke estimation value. Accordingly, an error in the calculated stroke estimation value is increased due to variation in the parameters of the motor (in particular, resistance and inductance) and non-linearity.

In addition, in the apparatus and the method for controlling operation of the reciprocating compressor in accordance with the conventional art, because an error in the calculated stroke estimation value is great, it is impossible to control operation of the compressor accurately or precisely.

SUMMARY OF THE INVENTION

In order to solve the above-mentioned problem, it is an object of the present invention to provide an apparatus and a method for controlling operation of a reciprocating compressor capable of controlling operation of a compressor accurately and precisely by decreasing an error in a stroke estimation value of the compressor by removing deviation caused by resistance and inductance.

In order to achieve the above-mentioned object, an apparatus for controlling operation of a compressor in accordance with the present invention includes a counter electromotive force detector that detects a counter electromotive force generated at a motor of a compressor, a stroke calculator that calculates a stroke estimation value of the compressor on the basis of the counter electromotive force, and a stroke controller that controls a stroke of the compressor by varying a voltage applied to the motor according to a result of comparing the calculated stroke estimation value with a stroke reference value.

In order to achieve the above-mentioned object, a method for controlling operation of a compressor in accordance with the present invention includes cutting off current applied to a motor of a compressor for a certain period, detecting a counter electromotive force of the motor for the certain current cut-off period, calculating a stroke estimation value of the compressor on the basis of the detected counter electromotive force, and controlling a stroke of the compressor by varying a voltage applied to the motor according to a result of comparing the calculated stroke estimation value with a stroke reference value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiment of an apparatus and a method for controlling operation of a compressor in accordance with the present invention capable of removing deviation due to resistance and inductance by detecting a counter electromotive force generated at a motor of a compressor, calculating a stroke estimation value of the compressor on the basis of the detected counter electromotive force and varying a voltage applied to the motor on the basis of the calculated stroke estimation value and a stroke reference value, and controlling operation of the compressor accurately and precisely by decreasing an error in the stroke estimation value of the compressor will be described in detail.

Figure 1:
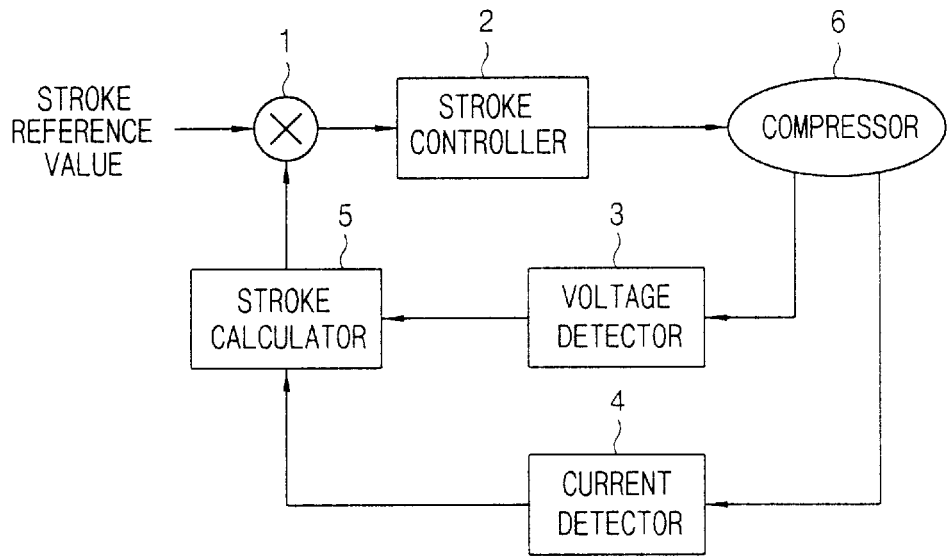
FIG. 1 is a block diagram illustrating a construction of an operation control apparatus of a reciprocating compressor in accordance with the conventional art.
Figure 2:
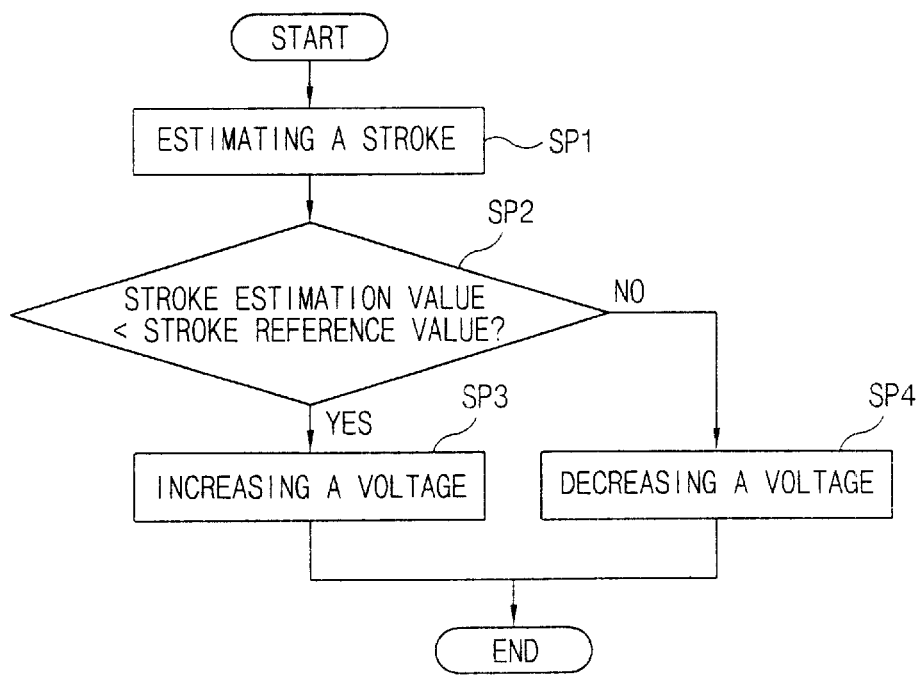
FIG. 2 is a flow chart illustrating an operation control method of a reciprocating compressor in accordance with the conventional art.
Figure 3:
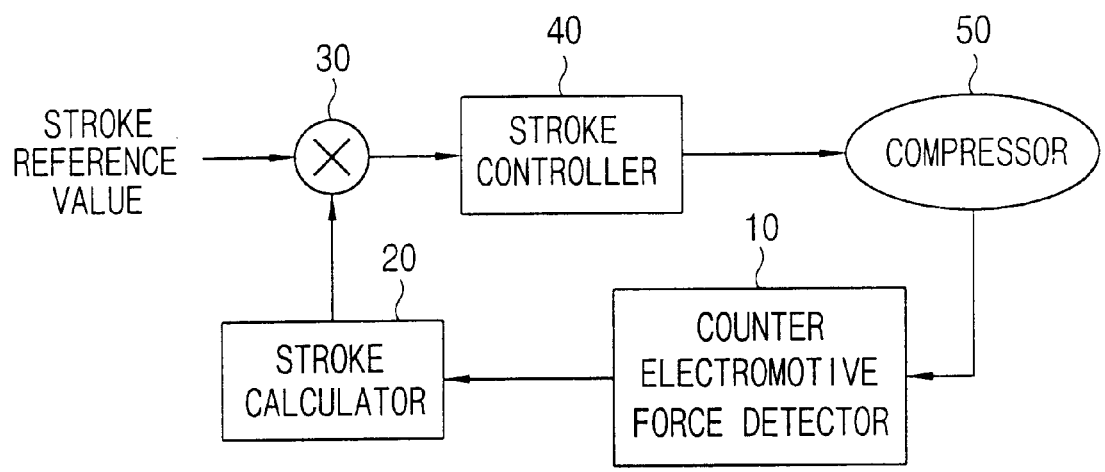
FIG. 3 is a block diagram illustrating a construction of an operation control apparatus of a reciprocating compressor in accordance with the present invention.

FIG. 3 is a block diagram illustrating a construction of an operation control apparatus of a reciprocating compressor in accordance with the present invention.

As depicted in FIG. 3, the operation control apparatus of the reciprocating compressor includes a counter electromotive force detector 10 for detecting a counter electromotive force of the motor for a certain period; a stroke calculator 20 for calculating a stroke estimation value of the compressor 50 on the basis of the counter electromotive force detected from the counter electromotive detector 10; a comparator 30 for comparing the calculated stroke estimation value with a stroke reference value and outputting a signal corresponding to a difference value according to the comparison result; and a stroke controller 40 for cuffing off current applied to a motor (not shown) of a compressor 50 temporarily for the certain period and for controlling a stroke of the compressor 50 by varying a voltage applied to the motor in order to vary a stroke of the compressor 50 on the basis of the signal outputted from the comparator 30. Hereinafter, operation of the operation control apparatus of the reciprocating compressor will be described in detail with reference to accompanying FIG. 4.

Hereinafter, operation of the operation control apparatus of the reciprocating compressor will be described in detail with reference to accompanying FIG. 4.

Figure 4:
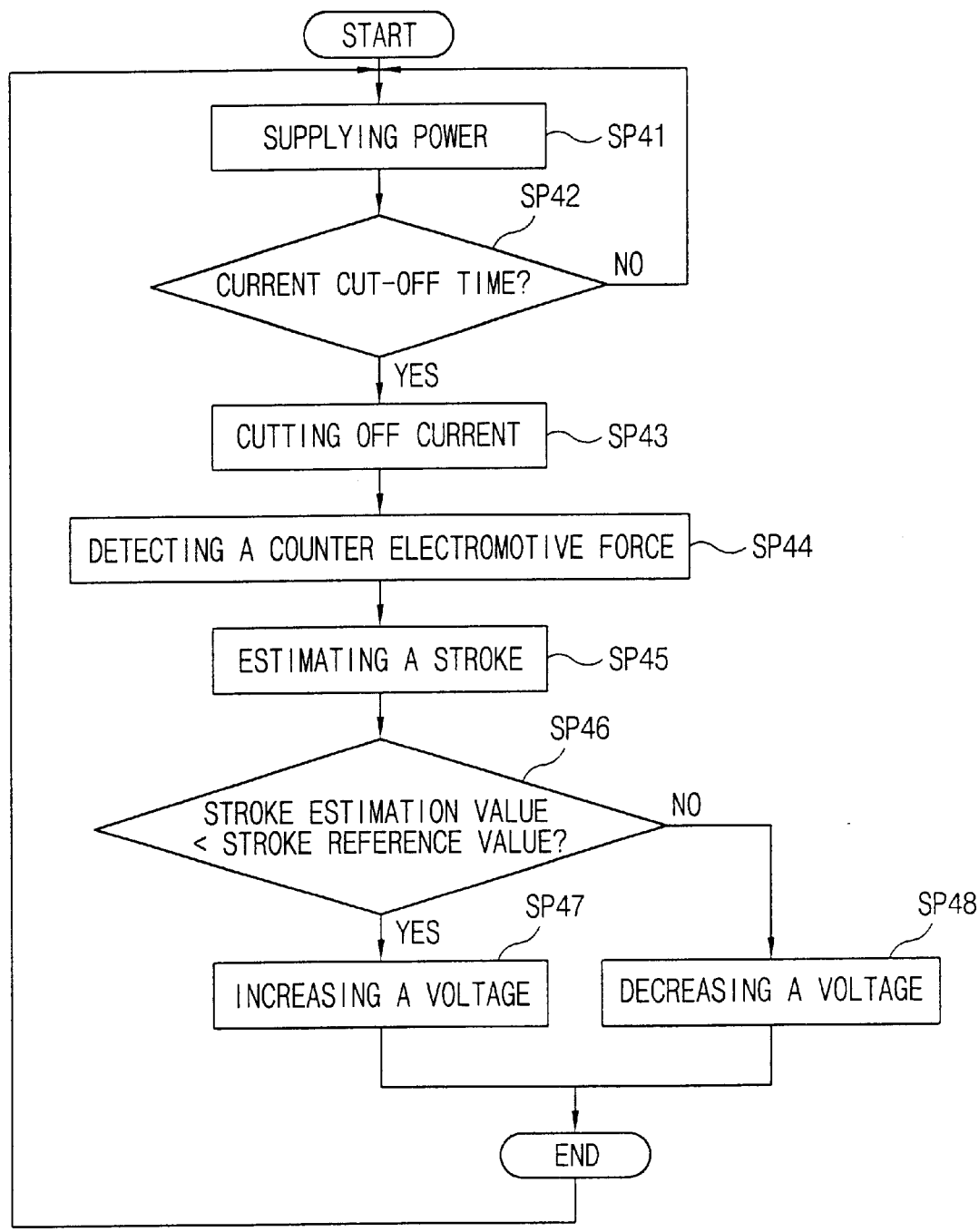
FIG. 4 is a flow chart illustrating an operation, control method of a reciprocating compressor in accordance with the present invention.

FIG. 4 is a flow chart illustrating the operation control method of the reciprocating compressor in accordance with the present invention.

First, when current is applied to the motor of the compressor 50 as shown at SP 41, the counter electromotive force detector 10 judges whether a preset current cut-off time has arrived as shown at step SP42.

When the preset current cut-off time has passed, the stroke controller 40 temporarily cuts off current flowing to the motor for a certain period (for example, one period) as shown at step SP43. The counter electromotive force detector 10 detects a counter electromotive force of the motor for the certain period in which the current is cut off as shown at step SP44 and outputs the detected counter electromotive force value to the stroke calculator 20. In more detail, in order to detect the counter electromotive force, the counter electromotive force detector 10 detects a voltage (counter electromotive force) of the motor at a point of time at which the current is cut off.

Herein, the detected counter electromotive force value is the same as a value calculated by following Equation 2.

$$\text{Counter electromotive force} = \alpha \bar{x} \qquad \text{Equation 2}$$

Herein, $\alpha$ is a motor constant, $\bar{x}$ is a piston speed of the compressor.

Afterward, the stroke calculator 20 applies the detected counter electromotive force value to following Equation 3 and calculates a stroke estimation value (X) and applies the calculated stroke estimation value (X) to the comparator 30 as shown at SP45.

$$X = \frac{1}{\alpha} \int (\alpha \bar{x}) dt \qquad \text{Equation 3}$$

The comparator 30 compares the stroke estimation value (X) with the stroke reference value and applies a difference between the two values according to the comparison to the stroke controller 40 as shown at step SP46. Herein, the stroke controller 40 controls a stroke of the compressor 50 by varying a voltage applied to the motor of the compressor 50 on the basis of the above difference.

When the stroke estimation value is less than the stroke reference value, the stroke controller 40 increases a voltage applied to the motor in order to control a stroke of the compressor 50 as shown at step SP47, and when the stroke estimation value is greater than the stroke reference value, the stroke controller 40 decreases a voltage applied to the motor as shown at step SP48. Hereinafter, a method for detecting a counter electromotive force of the motor and a method for calculating accurately a stroke estimation value of the compressor on the basis of the detected counter electromotive force value will be described with reference to accompanying FIG. 5.

Figure 5:
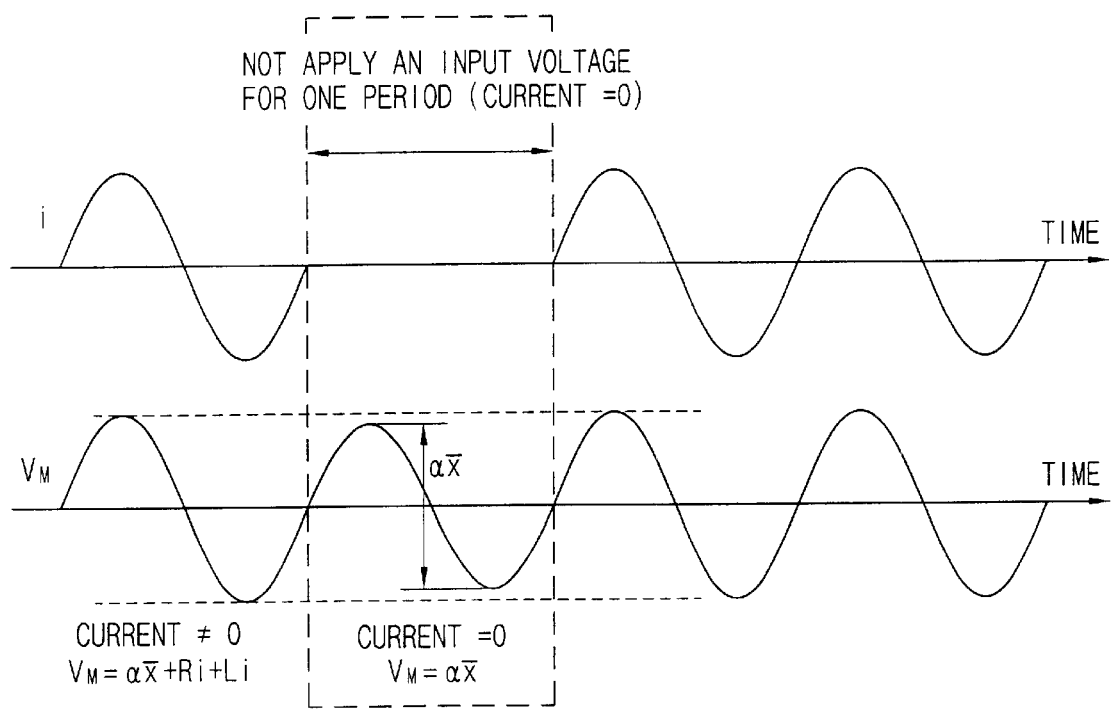
FIG. 5 is a wave diagram illustrating a point of time at which a counter electromotive force of a motor is detected in accordance with the present invention.

FIG. 5 is a wave diagram illustrating a point of time at which a counter electromotive force of a motor is detected in accordance with the present invention.

As depicted in FIG. 5, while current is applied to the motor of the compressor 50, in order to detect the counter electromotive force, current applied to the motor is cut off for e.g., at least one period. Herein, for the current cut off period, a voltage of the motor is detected. Herein, a voltage detected at a point of time at which the current is cut off is a counter electromotive force.

Afterward, by substituting the detected counter electromotive force value for Equation 3, a stroke estimation value is calculated, the calculated stroke estimation value is compared with a stroke reference value, according to the comparison result a voltage applied to the motor is varied, and accordingly it is possible to control a stroke of the compressor 50 precisely. In more detail, when the stroke estimation value is greater than the stroke reference value, a voltage applied to the motor is decreased, when the stroke estimation value is less than the stroke reference value, a voltage applied to the motor is increased. In more detail, by cutting off the current flowing to the motor of the compressor 50 for a certain period, a stroke of the compressor is estimated accurately by detecting the counter electromotive force for the current cut off period, and accordingly deviation of a stroke estimation value of the compressor can be greatly reduced. In more detail, because there is no need to consider deviation of inductance and resistance among the motor parameters, it is possible to reduce deviation of a stroke estimation value of the compressor 50.

For example, when current applied to the motor of the compressor 50 is 0 (current=0), a voltage value ($V_M$) is the same as the detected counter electromotive force value, when current applied to the motor of the compressor is not 0 (current≠0), a voltage value ($V_M$) is calculated by Equation as $\alpha\bar{x}+Ri+L\bar{i}$. Accordingly, in order to remove deviation occurred by resistance (R) and inductance (L), current applied to the motor is temporarily cut off, a counter electromotive force (voltage) of the motor is detected at a point of time at which the current is cut off, the detected counter electromotive force value is substituted for Equation 3, and accordingly a stroke estimation value of the compressor 50 can be accurately calculated regardless of deviation due to variation in the resistance (R) and inductance (L).

As described above, in the present invention, by cutting off current flowing to the motor of the compressor for a certain period, detecting a counter electromotive force for the current cut-off period and estimating a stroke of the compressor accurately on the basis of the detected counter electromotive force value, estimation deviation of a stroke of the compressor can be reduced.

In addition, by removing deviation of inductance and resistance among parameters of the motor and estimating a stroke of the compressor accurately on the basis of a detected counter electromotive force value, estimation deviation of a stroke of the compressor can be reduced, and accordingly it is possible to control operation of the compressor accurately and precisely.

The present disclosure relates to subject matter contained in priority Korean Application No. 2002-0060730, which is herein expressly incorporated by reference in its entirety.

What is claimed is:

1. A method for controlling operation of a reciprocating compressor, comprising:
   cuffing off current applied to a motor of a reciprocating compressor for a predetermined period;
   detecting a counter electromotive force of the motor for the predetermined current cut-off period;
   calculating a stroke estimation value of the reciprocating compressor on the basis of the detected counter electromotive force; and
   controlling a stroke of the reciprocating compressor by varying a voltage applied to the motor on the basis of the calculated stroke estimation value and a stroke reference value, wherein the voltage applied to the motor is increased when the stroke estimation value is less than the stroke reference value, and the voltage applied to the motor is decreased when the stroke estimation value is greater than the stroke reference value.

2. The method of claim 1, wherein the stroke estimation value is calculated by $$\frac{1}{\alpha}\int(\alpha\bar{x})dt$$

equation, herein, $\alpha$ is a motor constant, $\bar{x}$ is a piston speed of the compressor, and $\alpha\bar{x}$ is the detected counter electromotive force value.

3. The method of claim 1, wherein the counter electromotive force detecting cuts off current flowing to the motor for at least one period and detects a voltage generated at the motor for the current cut-off period.

* * * * *